(No Model.)
D. C. WILGUS.
LAWN SPRINKLER.
No. 443,734. Patented Dec. 30, 1890.
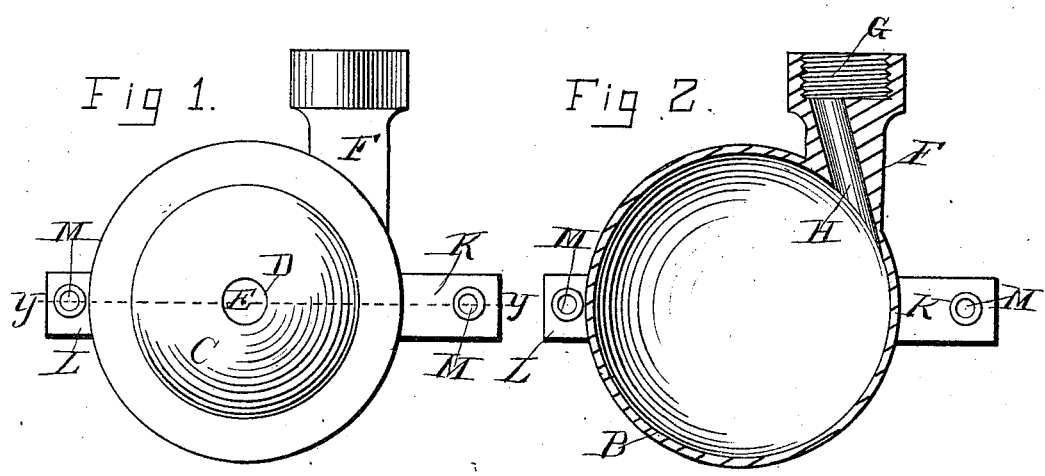
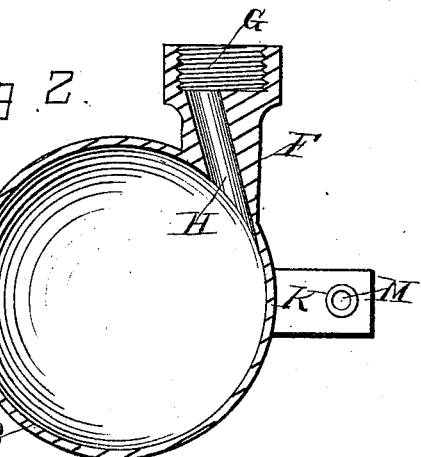
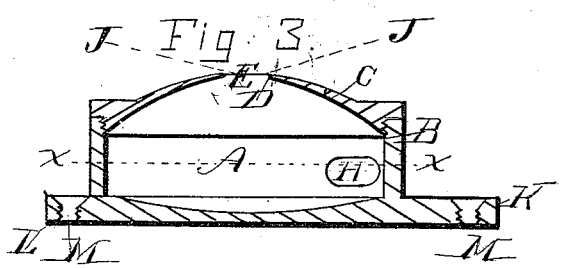
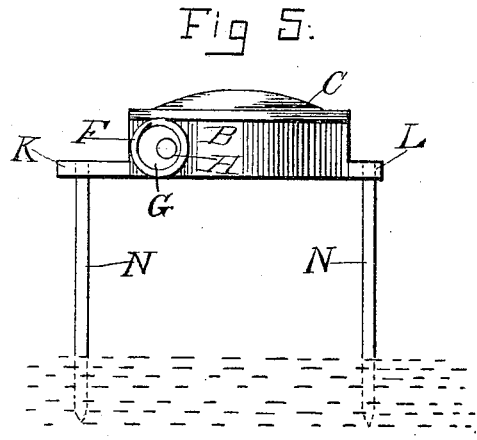
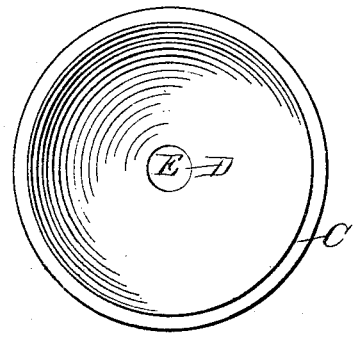
Witnesses.
M. C. Gates
Alfred J. Townsend
Inventor.
Daniel C. Wilgus
by
Hazard & Townsend
his atty

UNITED STATES PATENT OFFICE.

DANIEL C. WILGUS, OF LOS ANGELES, CALIFORNIA.

LAWN-SPRINKLER.

SPECIFICATION forming part of Letters Patent No. 443,734, dated December 30, 1890.

Application filed June 14, 1890. Serial No. 355,478. (No model.)

*To all whom it may concern:*

Be it known that I, DANIEL C. WILGUS, a citizen of the United States, residing at Los Angeles, in the county of Los Angeles and State of California, have invented a new and useful Improvement in Lawn-Sprinklers, of which the following is a specification.

The object of my invention is to produce a small, compact, cheap, and durable sprinkler which will sprinkle evenly and which can be used lying flat upon the lawn or elevated thereabove, as may be desired.

My invention relates more particularly to the peculiar construction, form, and arrangement of parts whereby I secure superior operation, and also to the means for securing stability.

It comprises, essentially, a flat circular inclosed convexo-convex reservoir or chamber having a tangential feed or induct passage and a superior or top central circular discharge-opening.

It also comprises certain features which will hereinafter be more fully set forth.

The accompanying drawings illustrate my invention.

Figure 1 is a top view of my improved sprinkler. Fig. 2 is a mid-section on line *x x*, Fig. 3. Fig. 3 is a mid-section on line *y y*, Fig. 1. Fig. 4 is a view of the under face of the top or cap. Fig. 5 is an elevation of the sprinkler as it appears when elevated above the lawn.

A is the circular convexo-convex chamber or reservoir.

B is the case.

C is the cap, concavo-convex in form and centrally perforated. The margin D of the central perforation or discharge-opening E is brought to a sharp knife-edge.

F is the induct-boss, having the screw-socket G to make connection with the hose or service-pipe. Within this boss is provided the feed or induct passage H, which opens into the reservoir or chamber A and is arranged approximately at a tangent with the periphery of the chamber, so that the inflowing water will cause a rotation of the body of water in the chamber. The rotation of the body of water, together with the arched cap or dome, causes the discharge through the knife-edged central hole E in the apex of the dome to be evenly distributed in a fine spray over a greater or less circle owing to the pressure of water in the chamber. Dotted lines J J are designed to show approximately the inclination at which the spray is discharged. The double convex or convexo-convex form of the chamber produced by the concave top and concave bottom, taken in connection with the location of the discharge opening or outlet in line with axis of the double convex chamber, gives freedom of motion to the revolving body of water to which a whirling motion is imparted by reason of the tangential inlet and prevents any choking action at the outlet. The effect of the location of the induct-opening at the side is to cause a recoil of the sprinkler which forces it to turn over. I overcome this difficulty by means of the long side lug K, projecting from the annular case B of the chamber approximately at the tangent-point of the induct-passage and chamber-wall and approximately at right angles with the axis of the induct-passage. The lug thus placed secures perfect stability of the sprinkler when it is in use laid upon a lawn.

In order to adapt the sprinkler for use in an elevated position, I provide a second side lug L upon the opposite side of the case from lug K, and I provide a screw-threaded perforation M through each lug. I screw the upper ends of standards or support-rods N N into the perforated lugs. These standards, designed to be mounted in the perforated lugs, are preferably sharpened at their lower ends, so that they can be set into the earth, as suggested in Fig. 5.

The sprinkler may be secured to a board, if desired, by screws passed through the holes M M.

I am aware of the state of the art as disclosed in the United States patent to Gauthier, No. 286,121, dated July 17, 1888, which shows an atomizing-nozzle consisting of a tubular coupling-shank and of a barrel formed at right angles to such shank, and whose inner vertical wall projects across the bore of the shank to form a narrow slit at one side of said bore, thus forming, practically, an ingress opening tangential with the lower part or reservoir of said barrel, which is enlarged and is more or less spherical, while the upper part of the barrel is cylindrical and is provided with a thick internally-flat-faced perforated cap, the perforation of which is made tapering inwardly. My invention differs from this in that I dispense with the long cylindrical barrel and provide an internally-concaved top provided with a plain central circular discharge-opening. My invention differs further in its preferred form in that the reservoir is of a flat convexo-convex form. By my improved construction the water is caused to discharge in a funnel-shaped sheet and is not broken into a spray at the point of discharge as it is by the Gauthier atomizer. This difference is of special advantage in a lawn-sprinkler as distinguished from an atomizer, because it increases the areal capacity of the sprinkler—that is to say, the water is distributed over a larger area than is possible or is designed with the Gauthier atomizer.

Now, having described my invention, what I claim as new, and desire to secure by Letters Patent, is—

1. In combination with the circular reservoir having the tangential inlet, the top made concave upon its under face and provided with a central discharge-opening.

2. The sprinkler having a double convex circular chamber, an elevated discharge-opening in line with the axis of the chamber, and a tangential inlet.

3. In combination with the circular reservoir having the tangential inlet, the concave top C, provided with the knife-edged central discharge-opening.

DANIEL C. WILGUS.

Witnesses:
JAMES R. TOWNSEND,
ALFRED I. TOWNSEND.